(No Model.)
L. W. ELLIOTT.
FRICTION CLUTCH.
No. 540,382. Patented June 4, 1895.
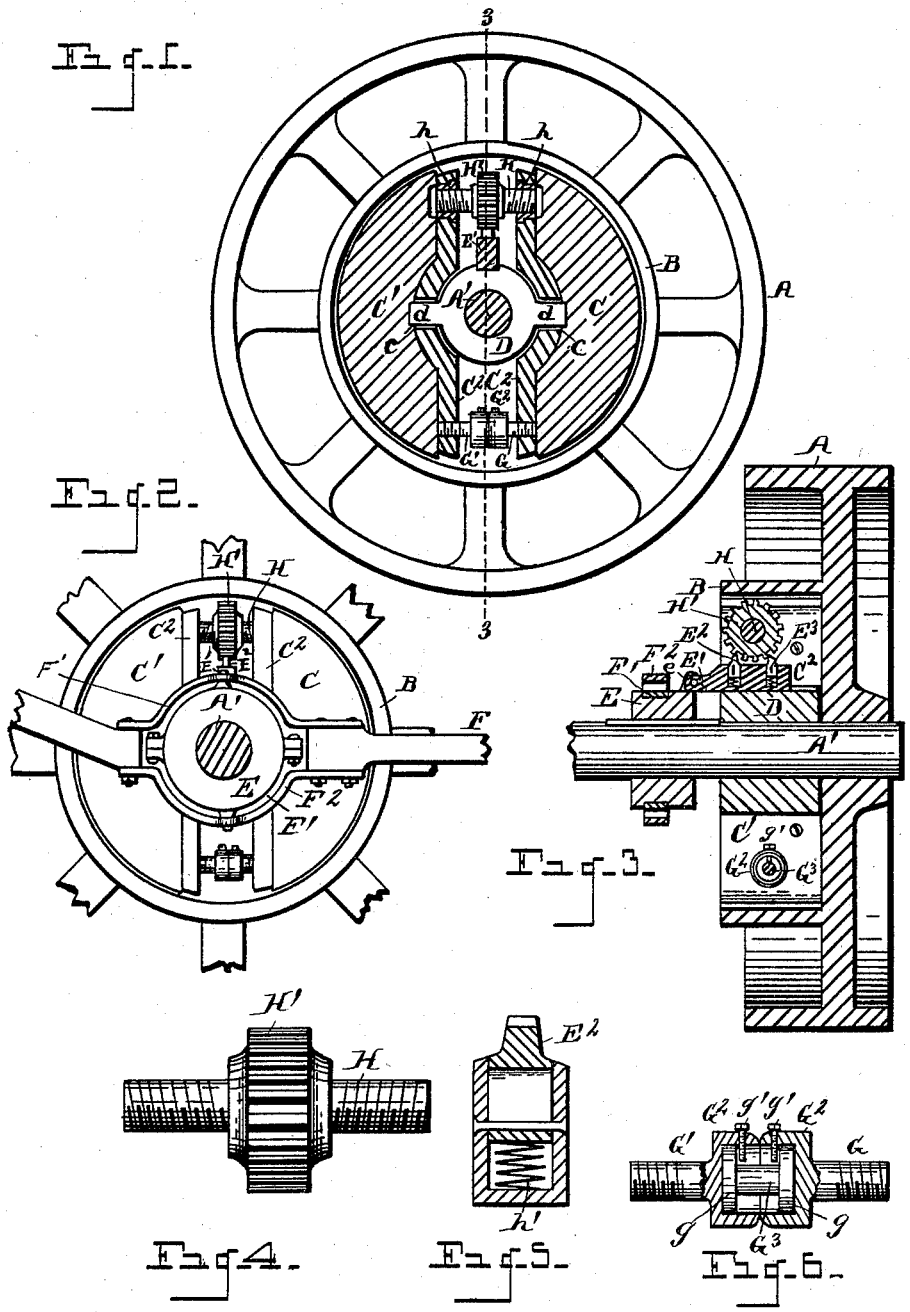
WITNESSES
Otto P. Banziger.
M. A. Martin.
INVENTOR
Lucius W. Elliott
By his Attorney
Murell & Wright.
THE NORRIS PETERS CO., PHOTO-LITHO., WASHINGTON, D.C.

UNITED STATES PATENT OFFICE.

LUCIUS W. ELLIOTT, OF NORTHVILLE, MICHIGAN, ASSIGNOR OF ONE-HALF TO WILLIAM H. YERKES, OF SAME PLACE.

FRICTION-CLUTCH.

SPECIFICATION forming part of Letters Patent No. 540,382, dated June 4, 1895.

Application filed December 15, 1894. Serial No. 531,930. (No model.)

*To all whom it may concern:*

Be it known that I, LUCIUS W. ELLIOTT, a citizen of the United States, residing at Northville, county of Wayne, State of Michigan, have invented a certain new and useful Improvement in Friction-Clutches; and I declare the following to be a full, clear, and exact description of the invention, such as will enable others skilled in the art to which it appertains to make and use the same, reference being had to the accompanying drawings, which form a part of this specification.

My invention pertains to certain new and useful improvements in a friction clutch, and it consists in the construction, combination and arrangement of devices hereinafter specified and claimed and illustrated in the accompanying drawings, in which—

Figure 1 is a side elevation showing parts in section. Fig. 2 is a side elevation. Fig. 3 is a view in section on the line 3 3, Fig. 1. Fig. 4 is a detail view of the tightening-screw. Fig. 5 is a detail view of one of the pawls. Fig. 6 is a detail view of the adjusting-screws.

The object of my invention is, more particularly, to provide improved means of tightening up a friction clutch to compensate for any wear and whereby the tightening may be effected as desired while the machinery is in motion without the necessity of stopping the machinery therefor, as has heretofore been required.

Obviously a friction clutch which can be tightened as desired without having to stop the machinery possesses superior advantages.

I carry out my invention as follows:

A represents a pulley loosely mounted upon a shaft A', and B a friction band engaged with said pulley. Within the friction band I locate two friction segments or blocks C C' made of wood or other suitable material, arranged to have a frictional bearing at their peripheries upon the inner surfaces of the friction band. The inner adjacent edges of said segments or blocks are preferably faced with metal plates $C^2$ $C^2$, extending on opposite sides of the driving shaft A', said blocks and plates being preferably concaved intermediate their ends to pass about said shaft. Upon the shaft within the friction band is a hub D, having a fixed engagement on the shaft, provided with arms $d$ $d$ engaged with the plates $C^2$ $C^2$, the latter being shown provided with orifices $c$ $c$ to receive said arms, whereby the blocks are rotated.

E denotes an additional sliding hub upon the shaft and having a longitudinal movement thereupon.

F represents an operating lever for moving the sliding hub E engaged about the periphery of the hub in a customary manner, as by bands F' $F^2$.

Between the plates $C^2$ $C^2$ at one end thereof, I locate adjusting screws G and G', their outer ends having a threaded engagement in said plates as shown. Their inner ends are constructed with housings $G^2$ $G^2$, within which is located a spool $G^3$ headed at each end as shown at $g$ $g$. Set screws $g'$ $g'$ through the housings hold the two together. The spool forms practically a hinge joint and serves to hold the friction blocks away from the band when the clutch is not in use.

It will be apparent that by adjusting the bolts G G' the plates $C^2$ $C^2$ may be adjusted at one extremity nearer together or farther apart as may be required. Between the opposite ends of said plates $C^2$ $C^2$, I locate a spindle H or tightening bolt having right and left screw threads upon its extremities and having a corresponding threaded engagement with the plates $C^2$ $C^2$. The said plates are preferably provided with nuts $h$ $h$ to receive the threaded ends of the bolt H. Intermediate the ends the bolt is provided with a ratchet or toothed head H'.

The sliding hub E is provided with a sliding arm E' extending over the hub D as shown in Fig. 3, and preferably having a counter sunk engagement therewith, said sliding arm being provided with spring pawls $E^2$ $E^3$ to engage the toothed head H' on opposite sides, as indicated.

It will readily be perceived that by seizing the operating lever F, the sliding hub E may be moved toward or from the hub D. When the sliding hub E is moved toward the hub D the pawl $E^2$ will engage the toothed head and turn it in a corresponding direction. By moving the sliding hub in the opposite direction, the other pawl $E^3$ will engage the toothed head to turn it in an opposite direction. By this means the bolt H may be turned in either direction required to spread the plates $C^2 C^2$, or otherwise, as desired, to tighten or loosen the friction blocks against the friction band. The operation of the lever F can, obviously, be effected as desired, at any time, without having to stop the machinery.

The arm E' is engaged with the hub E in any suitable manner, as by being bolted to ears $e$ upon the hub E. It will be seen that the arm E' being thus engaged with the hub D will cause the hub E to rotate upon the rotation of the hub D.

By adjusting the bolts G G' it is evident but little spreading of the blocks will be required to give the desired friction. The adjustment of the bolts G G' will but seldom be necessary. The spring pawls are so constructed and arranged that they may be repeatedly engaged with the toothed or ratchet head H' as many successive times as may be necessary to give the requisite throw to the tightening bolt H. To this end the outer end of the pawls may be rounded, and the pawl provided with a spring $h'$. By this construction when either pawl has been moved as far as it will retain its hold with the ratchet head, it may be moved back into normal position again, the pawl riding under the ratchet head in the contrary movement into normal position. This operation of either pawl may be repeated as many successive times as may be desired. It will be observed that either pawl may thus be thrown back into normal position to get a new hold upon the ratchet head without bringing the opposite pawl into engagement therewith.

It will be seen that by means of the lever F the friction clutch is put into operation whenever desired and thereby also the friction blocks are tightened to compensate for the wear thereupon.

What I claim as my invention is—

1. In a friction clutch, the combination of a pulley provided with a friction band, friction blocks located within said band on opposite sides of the shaft of the pulley, adjusting screws G G' to adjust the frictional tension of said blocks upon the band at one of their extremities, and a tightening bolt H to adjust the frictional tension of said blocks against the band at their opposite ends, said adjusting screws G G' having a threaded engagement with said plates at one of their extremities and having a jointed engagement at their opposite extremities, substantially as set forth.

2. In a friction clutch, the combination of a pulley provided with a friction band, of friction blocks, means to adjust the frictional tension of the blocks upon the band at one of their extremities, a tightening bolt H provided with a ratchet H' to adjust the frictional tension of the blocks against the band at their opposite extremities, and a reciprocatory arm E' provided with spring pawls $E^2$ $E^3$ to operate said ratchet, substantially as set forth.

3. In a friction clutch, the combination of a pulley provided with a friction band, of friction blocks, means to adjust the frictional tension of the blocks upon the band at one of their extremities, a tightening bolt H provided with a ratchet H' to adjust the frictional tension of the blocks against the band at their opposite extremities, and a reciprocatory arm E' provided with spring pawls $E^2$ $E^3$ to operate said ratchet, said pawls arranged to permit either of them being successively moved back into normal position to get a new hold upon the ratchet without bringing the other pawl into engagement therewith, substantially as set forth.

4. In a friction clutch the combination of a pulley provided with a friction band, friction blocks C C' provided with plates $C^2 C^2$, adjusting screws G G' having a threaded engagement with said plates at one of their extremities, said screws provided with housings $G^2 G^2$, a spool located within said housings, and set screws $g' g'$ to hold the housings engaged with the spool, substantially as set forth.

5. In a friction clutch, the combination of a pulley provided with a friction band, friction blocks located within the band, a tightening screw provided with a toothed head to adjust the tension of said blocks upon the band, a hub D located upon the shaft of the pulley, a sliding hub E mounted on the shaft, an arm E' engaged with the sliding hub provided with spring pawls $E^2$ $E^3$ to engage the toothed head, and a lever to manipulate the sliding hub, substantially as set forth.

6. In a friction clutch, the combination of a pulley provided with a friction band, friction blocks located within the band, a tightening screw provided with a toothed head to adjust the tension of said blocks upon the band, a hub D located upon the shaft of the pulley, a sliding hub E mounted on the shaft, an arm E' engaged with the sliding hub provided with spring pawls $E^2$ $E^3$ to engage the toothed head, and a lever to manipulate the sliding hub, said pawls arranged on opposite sides of the center of the tightening screw to turn the screw in either direction at the will of the operator, said pawls arranged to permit either of them being successively moved back into normal position to get a new hold upon the ratchet without bringing the other pawl into engagement therewith, substantially as set forth.

In testimony whereof I sign this specification in the presence of two witnesses.

LUCIUS W. ELLIOTT.

Witnesses:
N. S. WRIGHT,
MARY A. MARTIN.